United States Patent
Bernatz et al.

(10) Patent No.: US 6,551,643 B2
(45) Date of Patent: Apr. 22, 2003

(54) PROCESS AND APPARATUS FOR PRODUCING MINIATURE GUM BALL CENTERS USING AN UNDERWATER PELLETIZER

(75) Inventors: Kevin J. Bernatz, Palos Heights, IL (US); Enrique M. Valdez, Oak Lawn, IL (US); Lindell C. Richey, Lake Zurich, IL (US)

(73) Assignee: Wm. Wrigley Jr. Company, Chicago, IL (US)

( * ) Notice: Subject to any disclaimer, the term of this patent is extended or adjusted under 35 U.S.C. 154(b) by 0 days.

(21) Appl. No.: 09/681,693

(22) Filed: May 22, 2001

(65) Prior Publication Data

US 2003/0021871 A1 Jan. 30, 2003

(51) Int. Cl.⁷ .............................. A23G 3/00; B29B 9/00
(52) U.S. Cl. .................... 426/516; 425/67; 425/202; 425/311; 426/5; 426/289; 426/518
(58) Field of Search .......................... 426/5, 512, 516, 426/518, 289, 660; 425/67, 202, 311

(56) References Cited

U.S. PATENT DOCUMENTS

| | | |
|---|---|---|
| 4,117,645 A | 10/1978 | Phillips |
| 4,476,019 A | 10/1984 | Nowisch et al. |
| 4,728,275 A | 3/1988 | DiLullo et al. |
| 4,728,276 A | 3/1988 | Pauley et al. |
| 5,059,103 A | 10/1991 | Bruckmann et al. |
| 5,248,228 A | 9/1993 | Giardina |
| 5,324,530 A * | 6/1994 | Kehoe et al. ................ 426/5 |
| 5,435,714 A * | 7/1995 | Van Lengerich et al. ... 426/518 |
| 5,536,511 A | 7/1996 | Yatka |
| 5,667,824 A | 9/1997 | Ream et al. |
| 5,750,173 A * | 5/1998 | Kazemzadeh ............... 426/516 |
| 5,773,587 A | 6/1998 | Lowe et al. |
| 5,895,617 A | 4/1999 | Mizuguchi et al. |

OTHER PUBLICATIONS

"Medicament", Roget's II: The New Thesaurus, Third Edition, 1995.
Gala Industries Underwater Pellitizer Information (from website, 12 pages), Nov. 1997.

* cited by examiner

Primary Examiner—George C. Yeung
(74) Attorney, Agent, or Firm—Bell, Boyd & Lloyd LLC

(57) ABSTRACT

The present invention provides an apparatus and method for forming confectionery products into desired shapes. In an embodiment, the ingredients of a confectionery product, such as a bubble gum, are blended together. The ingredients are mixed, cooled and then formed into traditional center pieces. Next, the center pieces are fed into an underwater pelletizer. The underwater pelletizer cuts the extruded confectionery pieces into miniature products. A recirculating supply of water immediately sweeps away the miniature products from the pelletizer, cools the products and transport the products to a centrifugal dryer. The centrifugal dryer separates the miniature products from the circulating water. The separated miniature products are immediately dusted with an anti-agglomerating compound. Finally, the product is coated or otherwise packaged for consumption.

23 Claims, 3 Drawing Sheets

PROCESS AND APPARATUS FOR PRODUCING MINIATURE GUM BALL CENTERS USING AN UNDERWATER PELLETIZER

BACKGROUND OF THE INVENTION

The present invention relates generally to the field of confectionery products. More specifically, the present invention relates to forming confectionery products into desired shapes.

Confectionery products have been molded, extruded or otherwise shaped into various forms over the years. For example, bubble gum has been formed into shapes such as flat sticks, cylinders, cubes, cigars, shredded chew, and the like. Providing a confectionery product, such as bubble gum, in novel shapes or forms can lead to enhanced marketability of such a product, particularly with younger consumers.

An example of a traditional shape for chewing gum is the gum ball. For centuries, children as well as adults have enjoyed gum balls in a variety of flavors.

For gum balls having centers of ½ inch (1.3 cm) or greater, the process of forming such gum balls from a mass of confectionery product is well known. In this case, a confectionery product coupled with an extruder forms the confectionery product into ropes of gum. The ropes of gum have a diameter of approximately the diameter of the finished gum ball. Next, the ropes of gum are forced via centrifugal force through a plurality of spinning rods to form a multitude of individual gum balls. The individual gum balls are then sent through a cooling tunnel to harden. The resulting gum balls have a diameter of at least ½ inch (1.3 cm).

While this conventional method produces satisfactory ½ inch (1.3 cm) gum balls, it cannot be used to produce gum balls smaller than ½ inch (1.3 cm). Moreover, the gum's softness, flexibility and tackiness led the industry to believe for some time that producing smaller gum balls was infeasible.

More recently, methods and apparatuses for making gum balls or other products having a nominal diameter less than ½ inch (1.3 cm) have been developed. One method of producing such products includes die pressing a sheet or slab of confectionery material or gum, for example, by using a pair of rollers with corresponding spherical die depressions. Another method involves scoring a sheet of gum into separate cubes and physically contacting or tumbling the cubes so that they have a more spherical shape.

Die pressing suffers from the propensity of the gum balls to stick to an interior adhesion surface, i.e., the inner surface of the die. Solving the adhesion surface problem has led to inconvenient and expensive solutions, such as pre-chilling the die rollers. Tumbling, on the other hand, is time-consuming, inefficient, is limited to providing spherical shapes and does not provide an optimal spherical shape. Tumbling can also have the adhesion surface problem. Further, neither of these methods are practical for producing sub-miniature sized gum balls, for example, ⅛ inch (3.2 mm) diameter or less.

Miniature gum balls are an attractive confectionery product. A need exists to solve or avoid the problems associated with the current methods and apparatuses for forming miniature size confectionery products of less than ½ inch (1.3 cm). Further, since continually changing the size and shape of confectionery products is desirable, forming sub-miniature size gum balls is a novel size that can enhance the overall marketability of chewing gum.

SUMMARY OF THE INVENTION

The present invention relates generally to the field of confectionery products. More specifically, the present invention relates to forming confectionery products into miniature shapes. The present invention provides a method and apparatus for forming miniature size confectionery products. In one preferred embodiment, the present invention employs an underwater pelletizer that alleviates many of the problems concerning gum ball production.

To this end, in an embodiment, a method for forming miniature size confectionery products is provided. The method includes feeding confectionery products into an extruder. The method also includes extruding the products through a die plate. The method further includes cutting the extruded products in a liquid filled chamber to form miniature products. The method then includes drying the miniature products.

In an embodiment, the method includes feeding the products in a bulk mass.

In an embodiment, the products are chewing gum products.

In an embodiment, the products are medicaments.

In an embodiment, extruding the products includes pressurizing the products from 100 psig to 800 psig.

In an embodiment, extruding the products includes extruding the products through a plurality of apertures.

In an embodiment, the method includes the step of controlling the temperature of the die plate.

In an embodiment, the method includes the step of heating the die plate up to 220° F.

In an embodiment, the method includes transporting the miniature products from the die plate, in liquid, to a dryer.

In an embodiment, the method includes the step of controlling the temperature of the transporting liquid.

In an embodiment, the transporting liquid is water having a temperature of 40 to 65° F.

In an embodiment, the method includes the step of making up the transporting liquid with fresh transporting liquid.

In an embodiment, the method includes the step of dusting the discharged products with an anti-agglomerating compound.

In an embodiment, the method includes the step of passing the discharged products through a screen having apertures adapted to ensure correct product size.

In an embodiment, a method for forming miniature size chewing gum products is provided. The method includes mixing a plurality of ingredients to form a chewing gum mass. The method also includes adapting the chewing gum mass into a form receivable by a die plate. The method further includes forcing the mass through an aperture on an input side of the die plate, the aperture being smaller than the mass. The method then includes cutting the mass on the output side of the die plate to form miniature chewing gum products.

In an embodiment, adapting the mass includes heating the mass.

In an embodiment, adapting the mass includes sheeting the mass and cutting the mass into a plurality of pieces.

In an embodiment, adapting the mass includes rolling the mass into an elongated roll.

In an embodiment, forcing the pieces includes pressurizing the input side of the die plate.

In an embodiment, cutting the pieces includes cutting the pieces in water having a temperature that cools the pieces.

In an embodiment, cutting the pieces includes rotating a cutting blade across the aperture.

In an embodiment, an apparatus for forming miniature size confectionery products is provided. The apparatus includes an extruder that is adapted to receive a confectionery product, heat the product and pressurize the product from 100 to 800 psig. The apparatus also includes a pelletizer that is adapted to receive the pressurized confectionery product from the extruder. The pelletizer has a die plate that is heated up to 220° F. The die plate is adapted to withstand the force of the pressurized mass. The plate also defines a plurality of apertures that are in alignment with cutting blades. The cutting blades are housed inside a waterproof chamber that is part of the pelletizer.

In an embodiment, the apparatus includes a dryer in fluid communication with the waterproof chamber.

In an embodiment, the apparatus includes a device for dusting miniature products that are discharged from the die plate with an anti-agglomerating compound.

An advantage of the present invention is to provide improved methods and apparatuses for forming miniature and sub-miniature size confectionery products.

A further advantage of the present invention is to provide a method for producing confectionery products that has a high production rate.

Moreover, an advantage of the present invention is to provide a method of producing confectionery products that have good shape quality.

Yet another advantage of the present invention is to provide confectionery products having reduced deformation and product clumping.

Furthermore, an advantage of the present invention is to provide an apparatus that requires relatively little floor space inside a facility.

It is yet a further advantage of the present invention to provide a flexible apparatus that readily allows for the production of different sized confectionery products.

It is still another advantage of the present invention to provide a flexible apparatus that couples to many different confectionery forming devices, such as extruders, reactors, mixers and melt pump kneaders, each of which manipulate bulk confectionery product.

Additional features and advantages of the present invention will be described in and apparent from the detailed description of the presently preferred embodiments and from the figures.

DETAILED DESCRIPTION

The present invention provides improved methods and apparatuses for manufacturing miniature sized confectionery products and improved sub-miniature sized confectionery products. As used herein, the term "confectionery product(s)" is broadly used to encompass candies, including hard and chewy candy, chewing gums, and like products. In particular, miniature gum balls are an attractive confectionery product but have been difficult to efficiently and effectively manufacture.

Figure 1:
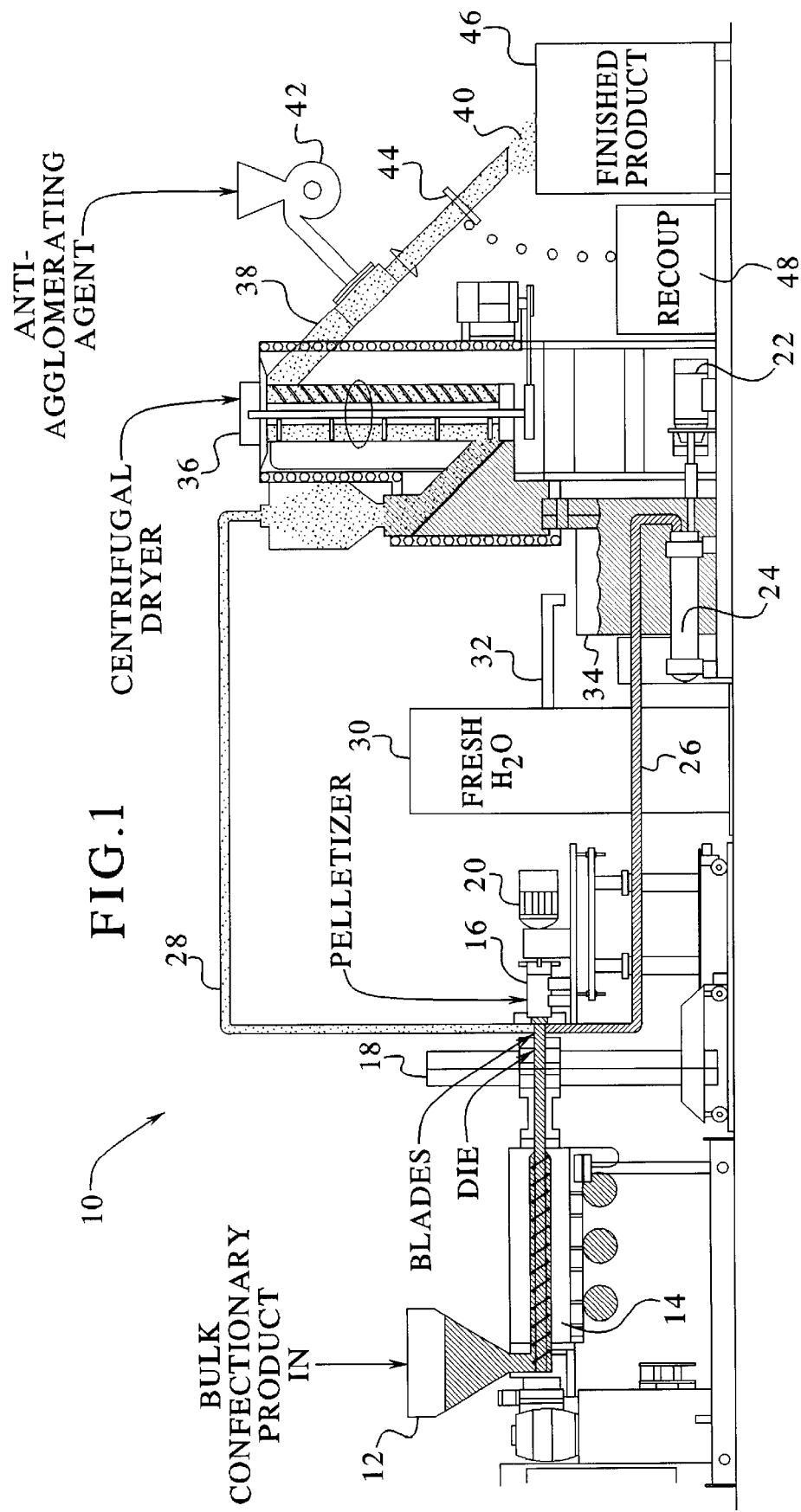
FIG. 1 is an elevation view of an embodiment of a forming system of the present invention having a plurality of components for forming the miniature confectionery products.

Referring now to FIG. 1, an embodiment of the system 10 for producing miniature confectionery products, namely miniature spherical gum balls of the present invention, is illustrated. In an embodiment, a plurality of chewing gum ingredients are combined to form a chewing mass. The mass is then sheeted and cut or die pressed into gum centers as is known. The illustrated system 10 includes a vibrating feeder 12, which is adapted to receive the gum centers. The feeder 12 holds the gum centers and evenly portions them into a single screw extruder 14. The single screw extruder 14 is adapted to heat the gum centers and pressurize them against a die plate of a pelletizer 16. In an alternative embodiment, the ingredients are mixed in a bulk mass, and the mass is extruded into elongated cylindrical rolls or ropes of confectionery product. The extruder 14 is adapted to receive, heat and pressurize the elongated cylindrical ropes.

The extruder 14 includes any suitable apparatus for heating the confectionery products, such as a number of heating elements (not illustrated) imbedded into or connected to the side walls or screw of the single screw extruder 14. It should be noted that when the products are in the form of cylindrical ropes, the feeder 12 may be modified or altogether eliminated. That is, a separate extruder used to form the cylindrical ropes may be adapted to extrude the ropes directly into the single screw or pressurizing extruder 14.

In either case, the mass of gum centers or gum rolls optionally passes through a polymer diverter valve 18. The polymer diverter valve 18 is connected to the extruder and is adapted to divert a flow of polymer in certain instances, such as prior to the start up of a process line or in the case of a die blockage. A variety of polymer diverter devices can be used. One type of polymer diverter has a hydraulically driven piston. With the piston in one position, the polymer is able to pass through the valve. Upon a triggering event, a signal controls the piston to move and discharge polymer to the floor or into a container to be reused. The diverter valve 18 protects the intricate die plates, such as the die plate of the pelletizer 16, when the openings or apertures of the die plate become blocked. A suitable polymer diverter valve is available from Gala Industries, Inc., Eagle Rock, Va.

Figure 3:
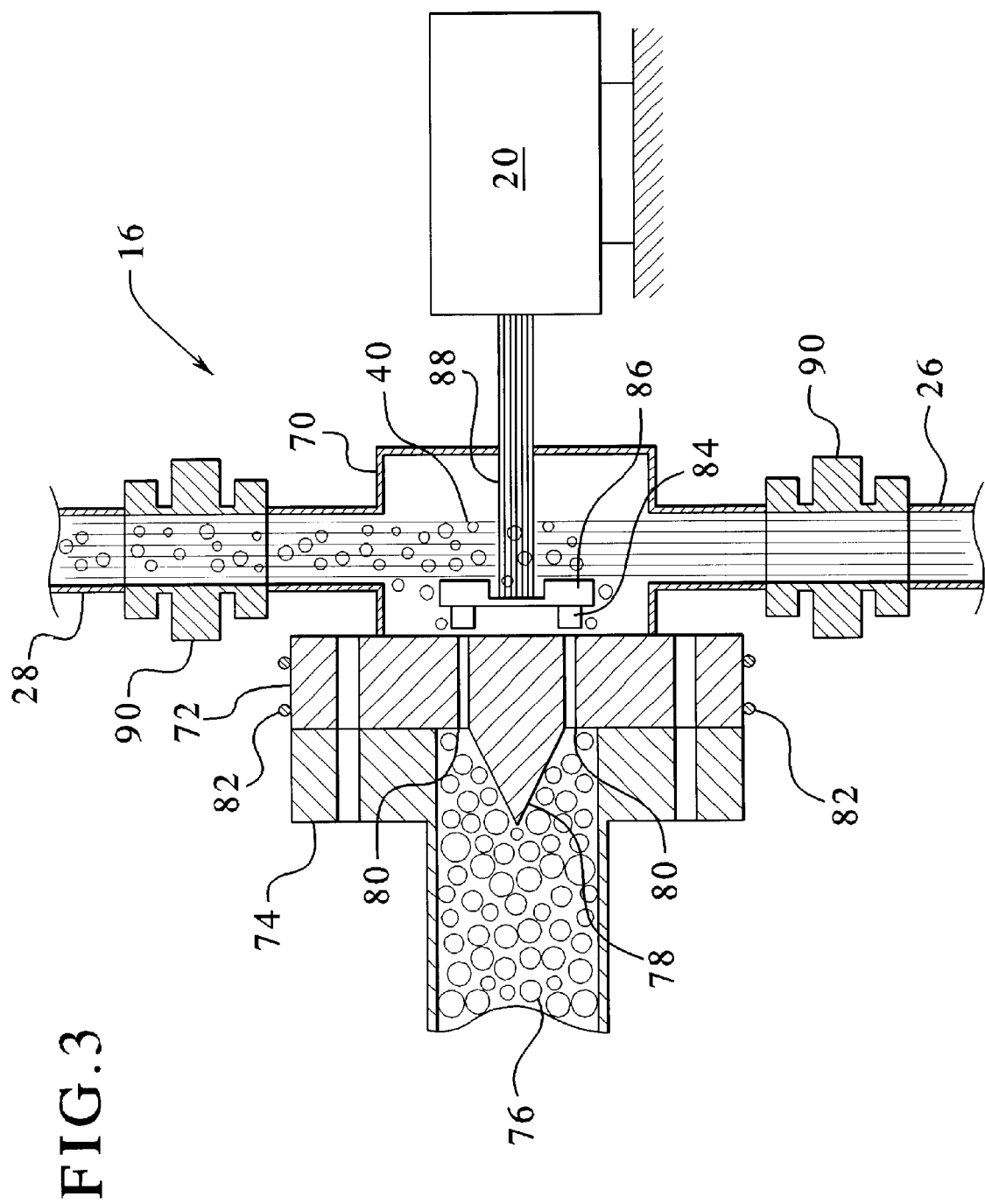
FIG. 3 is a schematic elevation sectional view of an embodiment of the cutting chamber of the pelletizer.

A pelletizer motor 20, which in one embodiment is a 5 HP, 3 phase, 3600 RPM electric motor, drives cutting blades inside a cutting chamber of the pelletizer 16. The enclosed cutting chamber, shown in FIG. 3, is disposed on the output side of the die plate. The motor driven cutting blades cut gum strands exiting the die plate into the miniature gum products as the strands exit the die plate. A suitable underwater pelletizer 16 with the pelletizer motor 20 is available from Gala Industries, Inc., Eagle Rock, Va.

A pump motor 22, which in one embodiment is a 5 HP, 3500 RPM electric motor, drives a process water pump 24. In an embodiment, the pump 24 has a capacity to pump 80 gallons of process water per minute. The process water pump 24 pumps water through a fresh water pipe 26, wherein the pipe 26 sealingly connects, e.g., via pipe threads, flanged connection or union, etc., to a process water inlet of the enclosed cutting chamber of the pelletizer 16. Through this connection, fresh water flushes the cutting chamber of the pelletizer 16 continuously as the cutting blades cut and form the miniature gum products. A slurry pipe 28, which sealingly connects to a process water outlet of the enclosed cutting chamber of the pelletizer 16, carries away a slurry including the process water and the miniature gum products.

In an embodiment, the system 10 pumps the fresh water through the pipe 26 by suitably filtering the used slurry water and recirculating the same water as the system 10 runs continuously. The system 10 may be adapted to employ any known mechanical or chemical type of water filtration, such as strainers, carbon filters, chlorine or ozone injection. In another embodiment, the system 10 pumps the fresh water through the pipe 26 by suitably filtering and recirculating some of the used slurry water and also by making up or changing some of the used slurry water with fresh water, e.g., from a fresh water tank 30. A further embodiment includes replacing all the used slurry water with new fresh water, such as from the fresh water tank 30. The fresh water tank 30 includes an outlet 32, wherein the outlet 32 is adapted to discharge new fresh water to a process water reservoir 34. The reservoir 34 is in fluid communication with the process water pump 24, which drives the process water system of the system 10 in any of these embodiments.

The water in the pipe 28 carries the freshly cut miniature gum products into a centrifugal force dewatering system or dryer (spin dryer) 36, which quickly separates the water from the miniature gum products, i.e., dries them. The centrifugal dryer 36 includes a process water inlet, which sealingly connects to the slurry pipe 28. The centrifugal dryer 36 also includes a process water outlet, which discharges the used slurry water into the reservoir 34 in the embodiments which include process water recirculation or into a drain (not illustrated) when the fresh water tank 30 supplies all the new fresh water to the process water pump 24. A suitable centrifugal dryer can be obtained from Gala Industries, Inc., Eagle Rock, Va.

One end of the centrifugal dryer 36 defines an opening that fluidly communicates with an opening of an end of a chute 38. The chute 38 may be adapted to bolt to or be clamped to the dryer 36 or otherwise connect to the dryer 36, so that the dewatered miniature gum products 40 are forced into the chute 38 and cannot escape from or fall outside of the chute 38. The chute 38 preferably angles downward and allows gravity to pull the dewatered miniature gum products 40 along the length of the chute 38.

At some point, preferably closer to the inlet end of the chute 38, the chute 38 defines an opening that fluidly communicates with an opening of a duster 42. The duster 42 may also be adapted to bolt to or be clamped to the chute 38. The duster 42 includes an inlet or hopper, which is adapted to receive an anti-agglomerating agent, such as calcium carbonate, talc, and the like. The duster 42 blows or otherwise allows gravity to dust or cover the miniature gum products 40 with the anti-agglomerating agent.

At some other point along the angled length of the chute 38, the chute 38 defines an opening that is adapted to receive a screen 44. The screen 44 preferably slides into the chute 38 and is easily removed for cleaning or replacement. The screen 44 defines a plurality of openings or apertures that allow properly sized miniature gum products 40 to pass through the screen 44 and into a finished miniature product receptacle 46. The screen 44 also catches clustered or agglomerated miniature products 40 or individual oversized products 40 and diverts these rejects to a recuperation bin 48. An operator at certain times collects the recouped oversized products of the bin 48 and returns them to the feeder 12 or the rope extruder (not illustrated), which are described above.

Figure 2:
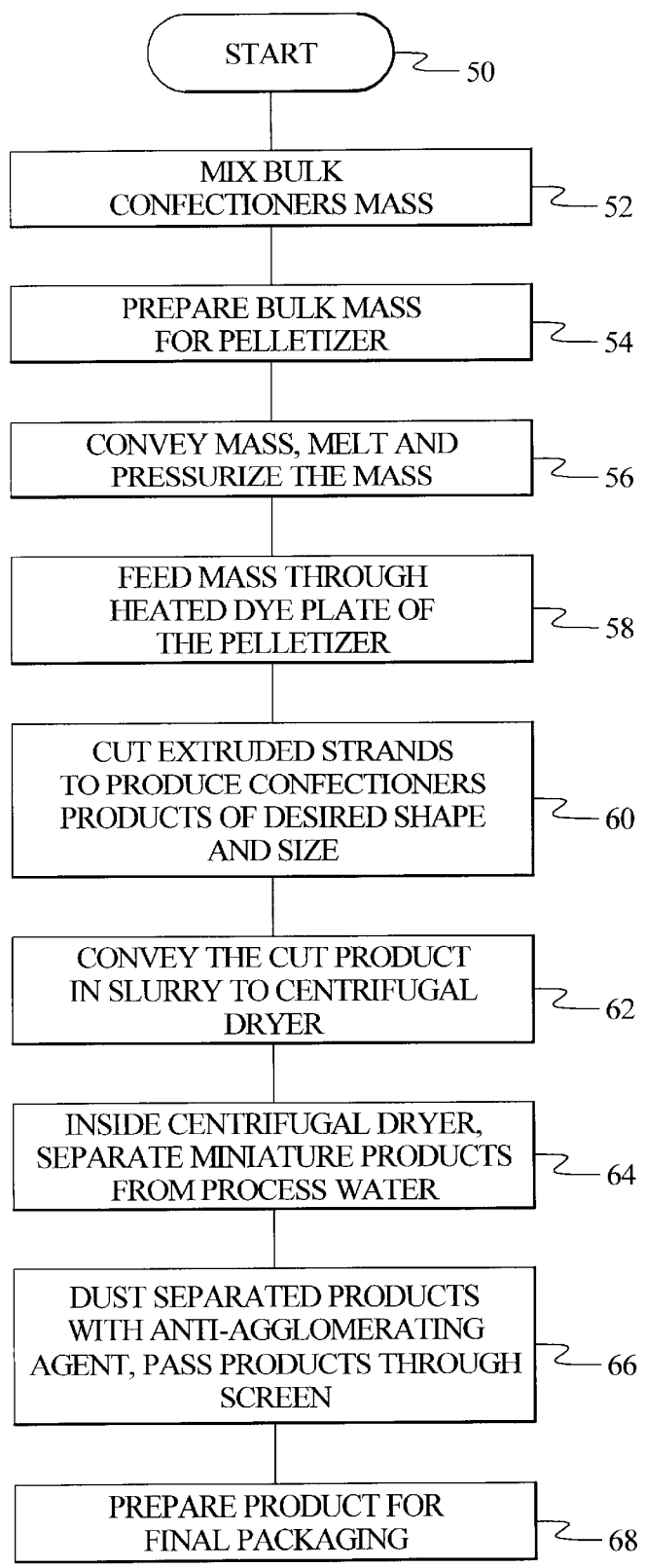
FIG. 2 is a schematic block diagram of a method for forming the miniature confectionery products of the present invention.

Referring now to FIGS. 1 and 2, an embodiment of the method or process of the present invention is schematically illustrated. Upon starting the process, as indicated by the oval 50, the ingredients of the miniature products 40, which are preferably gum or bubble gum products, are blended together in bulk, as indicated by the block 52. Typically, the base mix is prepared and then flavors and sweeteners are added. The bulk gum is then cooled to reduce its tackiness and to prepare it for initial piece forming.

Next, the bulk mass is prepared for the pelletizer, as indicated by the block 54. In one embodiment, the bulk mass is initially cut into traditional center pieces as is well known. In this embodiment, the bulk mass is preferably first formed into sheets of the mass and then cut or rolled and cut into traditional center pieces. The nominal size of the center pieces in one implementation is at least ½ inch (1.3 cm). Any known method for creating cylindrical, square or rectangular pellet shapes can be used to create the center pieces. The process of the present invention does not require the center pieces to be in any particular shape.

In another embodiment, a known rope extruder (not illustrated) extrudes the bulk confectionery mass into elongated lengths of gum rope. The ropes of gum are, in one implementation, at least ½ inch (1.3 cm) in diameter.

The confectionery pieces or ropes are then conveyed to the pelletizer 16, as indicated by the block 56. In the embodiment where the bulk product is cut into traditional center pieces, the center pieces are fed into the vibrating hopper or feeder 12. The vibrating feeder 12 then portions the center pieces into the pressurizing extruder 14, which in one embodiment is a single screw extruder. In the embodiment wherein the bulk mass is formed into the elongated ropes, the ropes are fed into the pressurizing extruder 14. The rope extruder may be adapted to directly convey the ropes into the pressurizing extruder 14, or a separate conveying mechanism (not illustrated) can bridge the rope extruder and the pressurizing extruder 14.

In either embodiment, the pressurizing extruder 14 conveys the center pieces or the elongated rope, pressurizes the confectionery mass up against a die plate of the pelletizer 16 and heats or melts the mass, so that it becomes malleable and formable. The head pressure supplied by the pressurizing extruder 14 is an important parameter in properly forming the desired spherical shape of the ultimate miniature products 40. In one preferred embodiment, the pressurizing extruder 14 creates a head pressure from 100 psig to 800 psig.

The pressurizing extruder 14 feeds the melted center pieces or confectionery rope into the heated die plate of the underwater pelletizer 16, as indicated by the block 58. As illustrated more fully in FIG. 3, the extruder 14 forces or extrudes the molten confectionery through an input side of the die plate, which has a series of orifices or apertures, to produce continuous strands of the mass on the output side of the die plate. The die head or die plate temperature is another important parameter in properly forming the desired spherical shape of the ultimate miniature products 40. In one preferred embodiment, the pelletizer 16 heats the die plate up to 220° F.

The motor driven underwater pelletizer 16 then cuts the extruded confectionery stands into the desired miniature products 40 of the present invention, as indicated by the block 60. In one embodiment, the die plate includes four orifices, each being 0.094 inch (2.4 mm) in diameter. The plate may be adapted to have any desired number of orifices having any diameter up to ½ inch (1.3 cm). The motor 20 of the pelletizer 16 drives a rotating wheel having a plurality of cutting blades positioned to cut the exiting strands into the desired miniature product shape as the product exits the die plate of the pelletizer 16. In one embodiment wherein the die plate includes four orifices, the rotating wheel includes three cutting blades and therefore cuts each orifice three times per revolution. The cutting plate may be adapted to have any number of cutting blades.

Cutting takes place in the enclosed water filled cutting chamber of the pelletizer, wherein the relatively cool circulating water immediately quenches or cools and solidifies the miniature confectionery products 40, thereby reducing their tackiness and tendency to clump or agglomerate. As indicated by the block 62, the circulating supply of water immediately carries away the cut miniature products 40 as a slurry from the pelletizer 16 and transports the miniature products 40, via the slurry pipe 28, to the centrifugal dryer 36. The cooling and transporting process water in one embodiment is maintained at approximately 55° F. The continuous fresh water make up system is preferably employed to avoid bacterial growth.

After the slurry of the process water and miniature confectionery products 40 travels through the slurry pipe 28 into the centrifugal dryer 36, the dryer 36 separates the miniature products 40 from the circulating process water, as indicated by the block 64. The spin dryer 36 dewaters or dries the miniature gum ball products 40 by using centripetal force to separate the process water from the miniature products 40, which have different densities, and letting the water drain downwardly and by letting the miniature products 40 travel upwardly and be carried away.

The separated miniature products 40 enter the chute 38, are immediately dusted with an anti-agglomerating compound, such as calcium carbonate, talc, etc. and pass through the screen 44, as indicated by the block 66. The miniature products 40 of the desired size fall through the screen 44 and into the finished product receptacle 46. The oversized or agglomerated products are separated into the recycling bin 48.

The miniature confectionery products 40 are then prepared for final packaging, as indicated by the block 68. That is, the miniature products 40 are coated or otherwise packaged for consumption. In one embodiment, gum balls are coated by conventional panning techniques, to create unique, coated, miniature gum balls. The bulk sweetener in the coating is preferably very stable, highly water-soluble and can be easily added to a panning solution. In one embodiment, the bulk sweeteners such as dextrose, ribose, fructose, xylitol, maltitol, palatinit, and the like, may be combined with sucrose, other polyols, or used alone in solution to coat the gum balls. In another embodiment, the bulk sweetener is also added as a powder that is blended with other powders used in certain types of panning procedures.

Conventional panning procedures generally use sucrose to coat the finished miniature gum products 40. Recent advances in panning enable the coatings to include other carbohydrate materials, such as dextrose, maltose, xylitol, hydrogenated isomaltulose, other new polyols and combinations or derivatives thereof. These materials are blended with panning modifiers including gum arabic, maltodextrins, corn syrup, gelatin, cellulose-type material like carboxymethyl cellulose, starch and modified starches, vegetable gums like alginates, locust bean gum, guar gum and talc. In another embodiment, antitack agents are also added as panning modifiers, which allow a variety of carbohydrates and sugar alcohols to be used.

The present invention can include a hand coating procedure for the miniature gum products 40, such as that disclosed in U.S. Pat. No. 5,536,511, which is incorporated herein by reference. The coating used to coat the miniature gum products 40 includes ingredients such as flavoring agents, artificial sweeteners, dispersing agents, coloring agents, film former and binding agents. The coating may further be adapted to meet other needs of the miniature gum products 40.

Referring now to FIG. 3, one embodiment of the pelletizer 16 having a watertight cutting chamber 70 is schematically illustrated. The watertight chamber 70 is formed integrally to or is welded to the die plate or die head 72. The die plate is sealingly mounted to a mating polymer flange 74, which couples to the diverter 18 (not illustrated) or otherwise to the pressurizing extruder 14 (not illustrated). The flange 74 encloses the melted, malleable and formable bulk confectionery material 76, which is shown here as the larger center cut pellets or pieces. The melted bulk material 76 is pressurized up against a nose 78 defined by the die plate 72. The nose 78 directs the bulk material 76 towards an inlet side of the plate 72, which defines a plurality of die apertures or orifices 80 of preferably uniform diameter. The present invention includes any suitable apparatus for heating the die plate 72, such as the illustrated heating elements 82 adapted to heat the die plate 72 to a desired temperature. The elements 82 are wound around, imbedded into or otherwise suitably connected to the die plate 72. A heater cover (not illustrated) covers and insulates the elements 82. The heating elements 82 are adapted to heat the die plate 72 to at least 220° F.

The apertures 80 cause the melted bulk material 76 to be squeezed into continuous strands. As the strands extrude through the exit side of the die plate 72, cutting blades 84 attached to a rotating wheel 86 immediately cut the strands to form the desired miniature gum products 40 of the present invention. The motor 20 mounted externally to the watertight chamber 70 couples to a shaft 88, wherein the shaft is in rotating and sealing engagement with the chamber 70. The shaft 88 in turn couples to the rotating wheel 86. The overall size, shape, weight and consistency of the miniature gum products 40 are effected by parameters such as the amount of bulk confectionery material fed per hour, extruder speed, extruder pressure, die plate 72 temperature, size of the apertures 80, cutting blade speed and number of cutting blades 84. As stated above, the extruder speed, die plate 72 temperature and cutting blade 84 speed have the greatest effect on the size, shape, weight and consistency of the products 40.

In an embodiment, the watertight chamber 70 connects to the fresh water pipe 26 and the slurry pipe 28 via a pair of unions 90. The connection may be adapted to employ any type of pipe connector. Fresh process water is pumped through the fresh water pipe 26. The process water carries away the miniature products 40 in a slurry through the slurry pipe 28 to the centrifugal dryer (not illustrated). In one embodiment, the process water is maintained at about 55° F. and is adapted to immediately cool the miniature products 40.

Examples of products that can be made using the present invention are set forth in U.S. patent application Ser. No. 09/681,692, entitled, "Coated Chewing Gum Products and Methods for Making Same," being filed herewith, the disclosure of which is incorporated herein by reference. This application is currently pending. In an embodiment, the bulk products and the miniature products 40 are medicaments, which are adapted to treat mouth or gum disease. By way of example, and not limitation, examples of the present invention will now be given.

EXAMPLES

A pelletizer was equipped with different die plates having multiple uniform apertures varying from 0.078 to 0.125 inch (2.0 mm to 3.2 mm) in diameter and a rotating plate having either three or six blades (i.e., 3 or 6 cuts/revolution). The trials using 0.094 inch (2.4 mm) die holes and three blades produced the best products. The pelletizer was operated in an upward underwater pelletizing orientation.

Chewing gum was the bulk confectionery material tested for miniaturization. Three different gum materials were tested and included the following ingredients:

TABLE 1

| Ingredients | (% Wt.) | | |
|---|---|---|---|
| | Example 1 | Example 2 | Example 3 |
| Gum Base | 70.00 | 48.45 | 59.90 |
| Talc | 12.00 | — | 16.00 |
| Ground Limestone | 8.45 | 24.50 | 16.00 |
| Sorbitol | — | 20.00 | — |
| Menthol | 2.00 | 1.50 | 2.00 |
| Encapsulated Aspartame | 1.00 | 0.50 | 0.50 |
| Encapsulated Acesulfame K | 1.00 | 0.50 | 0.50 |
| Acesulfame K | 0.05 | 0.05 | 0.05 |
| Flavor | 5.00 | 4.00 | 4.55 |
| Cooling Agent | 0.50 | 0.50 | 0.50 |

Experiments for Examples 1 and 2

Examples 1 and 2 were initially mixed into pellet shapes. The shapes were fed from a vibratory feeder into a pressurizing single screw extruder, which melted and forced the bulk gum through the temperature controlled pelletizer die holes. Upon exiting these holes, the gum was cut into the miniature products. Cutting took place in the water filled cutting chamber and the miniature products were immediately quenched in the circulating water supply. The miniature products were dried, dusted and screened as described above.

A total of ten operating conditions were tested to achieve and fine tune the desired miniature gum ball spherical shape and weights. The most important operating variables were the extruder speed, die head temperature and cutter speed. Tables 2 and 3 summarize the key operating parameters along with the achieved miniature gum ball weights and standard weight deviations. The results of Tests 1, 2, 4, 5, 6, 7 and 8 carried out multiple runs are as follows:

TABLE 2

| Test # | Extruder Speed (RPM) | Head Temp. (° F.) | Cutter Speed (RPM) | Head Pressure (PSI) | Rate (lbs/hr.) | Weight (g) | Weight (std. dev.) |
|---|---|---|---|---|---|---|---|
| 1 | 15 | 144 | 510 | 1190 | 88.8 | 0.119 | 0.003 |
| | | | | | | 0.093 | 0.004 |
| | | | | | | 0.080 | 0.013 |
| | | | | | | 0.088 | 0.013 |
| | | | | | | 0.128 | 0.013 |
| 2 | 19 | 157 | 390 | 720 | 71.4 | 0.117 | 0.011 |
| | | | | | | 0.130 | 0.011 |
| | | | | | | 0.114 | 0.010 |
| 3 | 19 | 161 | 390 | 750 | 67.8 | 0.105 | 0.016 |
| 4 | 32 | 172 | 420 | 150 | 81.3 | 0.127 | 0.023 |
| | | | | | | 0.124 | 0.014 |
| 5 | 30 | 173 | 420 | 240 | 67.9 | 0.111 | 0.020 |
| | | | | | | 0.128 | 0.020 |
| | | | | | | 0.135 | 0.030 |
| | | | | | | 0.123 | 0.020 |
| 6 | 30 | 174 | 390 | 350 | 53.8 | 0.114 | 0.027 |
| | | | | | | 0.120 | 0.016 |
| | | | | | | 0.103 | 0.014 |

TABLE 3

| Test # | Extruder Speed (RPM) | Head Temp. (° F.) | Cutter Speed (RPM) | Head Pressure (PSI) | Rate (lbs/hr.) | Weight (g) | Weight (std. dev.) |
|---|---|---|---|---|---|---|---|
| 7 | 20 | 131 | 703 | 540 | 132.6 | 0.127 | 0.016 |
| | | | | | | 0.113 | 0.009 |
| | | | | | | 0.108 | 0.021 |
| | | | | | | 0.116 | 0.014 |
| 8 | 20 | 178 | 703 | 560 | 132.6 | 0.122 | 0.016 |
| | | | | | | 0.143 | 0.021 |
| | | | | | | 0.107 | 0.017 |
| 9 | 19 | 181 | 720 | 560 | 144.6 | 0.123 | 0.017 |
| 10 | 20 | 180 | 759 | 810 | — | 0.115 | 0.021 |

Overall, test numbers 4 & 5 produced the most spherical miniature gum balls. Further, die head temperatures below 180° F. produced round to semi-round miniature gum balls. Die head temperatures in the range of 180–190° F. produced more oblong shaped miniature gum balls. Die head temperatures at 190° F. and above produced banana shaped gum products that could not be countered by adjusting other operating parameters (i.e., cutter speed, extrusion speed, etc.).

Experiment for Example 3

After the operating parameters had been more clearly defined, further testing was conducted on Example 3. The gum ingredients (flavors, sweeteners) from Example 3, were added at the end of a base mixing procedure before the bulk material was extruded through the underwater pelletizer. Table 4 shows the screen size and the % retained on the screens.

TABLE 4

| Screen Size (inches) | % Retained |
|---|---|
| 0.233 | 31.1% |
| 0.187 | 64.2% |
| 0.157 | 4.3% |

Example 3 had good product consistency, including shape, weight, and size acceptability. The blade speed, pump speed and temperature were adjusted several times during the run to maintain the target weight. All batches exhibited acceptable processing characteristics and there were no significant differences in the miniature products produced by the three batches.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modification's be covered by the appended claims.

What is claimed is:

1. A method for forming miniature size confectionery products comprising the steps of:
    feeding confectionery products into an extruder;
    extruding the products through a die plate;
    cutting the extruded products in a liquid filled chamber to form miniature products; and
    drying the miniature products.

2. The method of claim 1, which includes feeding the products in a bulk mass.

3. The method of claim 1, wherein the products are chewing gum products.

4. The method of claim 1, wherein the products are medicaments.

5. The method of claim 1, wherein extruding the products includes pressurizing the products from 100 psig to 800 psig.

6. The method of claim 1, wherein extruding the products includes extruding the products through a plurality of apertures.

7. The method of claim 1, which includes the step of controlling the temperature of the die plate.

8. The method of claim 1, which includes the step of heating the die plate up to 220° F.

9. The method of claim 1, which includes transporting the miniature products from the die plate, in liquid, to a dryer.

10. The method of claim 9, which includes the step of controlling the temperature of the transporting liquid.

11. The method of claim 9, wherein the transporting liquid is water having a temperature of 40 to 65° F.

12. The method of claim 9, which includes the step of making up the transporting liquid with fresh transporting liquid.

13. The method of claim 1, which includes the step of dusting the discharged products with an anti-agglomerating compound.

14. The method of claim 1, which includes the step of passing the discharged products through a screen having apertures adapted to ensure correct product size.

15. A method for forming miniature size chewing gum products comprising the steps of:
    mixing a plurality of ingredients to form a chewing gum mass;
    adapting the chewing gum mass into a form receivable by a die plate;
    forcing the mass through an aperture on an input side of the die plate, the aperture being smaller than the mass; and
    cutting the mass on the output side of the die plate to form miniature chewing gum products.

16. The method of claim 15, wherein adapting the mass includes heating the mass.

17. The method of claim 15, wherein adapting the mass includes sheeting the mass and cutting the mass into a plurality of pieces.

18. The method of claim 15, wherein adapting the mass includes rolling the mass into an elongated roll.

19. The method of claim 15, wherein forcing the pieces includes pressurizing the input side of the die plate.

20. The method of claim 15, wherein cutting the pieces includes cutting the pieces in water having a temperature that cools the pieces.

21. The method of claim 15, wherein cutting the pieces includes rotating a cutting blade across the aperture.

22. An apparatus for forming miniature size confectionery products comprising:
    an extruder adapted to receive a confectionery product, heat the product and pressurize the product from 100 to 800 psig;
    a pelletizer adapted to receive the pressurized confectionery product from the extruder, the pelletizer having a die plate heated up to 220° F., wherein the die plate is adapted to withstand the force of the pressurized product and wherein the plate defines a plurality of apertures that are in alignment with cutting blades housed inside a waterproof chamber of the pelletizer; and
    means for dusting the miniature confectionery products discharged from the die plate with an anti-agglomerating compound.

23. The apparatus of claim 22, which includes a dryer in fluid communication with the waterproof chamber.

* * * * *